United States Patent [19]

Ballard, Jr.

[11] Patent Number: 4,858,752
[45] Date of Patent: Aug. 22, 1989

[54] WHEEL ASSEMBLY FOR CONVEYER SYSTEM

[75] Inventor: Joe B. Ballard, Jr., De Soto, Tex.

[73] Assignee: Dynamic Conveyor Products, Fort Worth, Tex.

[21] Appl. No.: 152,408

[22] Filed: Feb. 4, 1988

[51] Int. Cl.$^4$ ............................................. B65G 39/20
[52] U.S. Cl. ................................... 198/845; 198/678; 104/95; 105/154
[58] Field of Search ........................ 198/845, 678, 838; 105/150, 154, 148; 104/95, 93, 89, 106, 107, 109, 118

[56] References Cited

U.S. PATENT DOCUMENTS

| | | |
|---|---|---|
| 1,944,713 | 1/1934 | Koons . |
| 2,223,870 | 12/1940 | Harris ................................ 104/95 X |
| 2,780,178 | 2/1957 | Zebley . |
| 3,469,892 | 9/1969 | Langstroth . |
| 3,553,765 | 1/1971 | Frost . |
| 3,602,150 | 8/1971 | Frost et al. ...................... 198/678 X |
| 3,797,925 | 1/1974 | Dawson . |
| 4,210,238 | 7/1980 | Frost et al. . |
| 4,248,157 | 2/1981 | Evans ................................ 105/154 |
| 4,433,627 | 2/1984 | Forshee . |
| 4,484,525 | 11/1984 | Forshee et al. . |

FOREIGN PATENT DOCUMENTS 3344289 6/1984 Fed. Rep. of Germany ........ 104/89

Primary Examiner—Robert J. Spar
Assistant Examiner—James R. Bidwell
Attorney, Agent, or Firm—James E. Bradley

[57] ABSTRACT

A wheel assembly for an overhead conveyor system is disclosed. The wheel assembly includes a self-lubricating thermoplastic wheel having a central opening with a conical section therein. An internally threaded axle member having a conical head is inserted into the central opening of the wheel, generally mating with the conical section of the central opening. An ordinary bolt is then utilized to secure a suspension member to the wheel and axle member combination. In a preferred embodiment of the present invention, The conical head of the axle member includes a slot adapted to receive a screwdriver head in order that a wheel may be removed and replaced without the necessity of disassembling the conveyor system. In conveyor systems utilizing an I-beam suspension, a pair of wheel assemblies may disposed in opposite positions to support a single suspension member.

12 Claims, 1 Drawing Sheet

WHEEL ASSEMBLY FOR CONVEYER SYSTEM

BACKGROUND OF THE INVENTION

1. Field of the Invention

This invention relates in general to conveyor systems and more particularly to plastic wheel assemblies for use with overhead conveyor systems.

2. Description of the Prior Art

Overhead conveyor systems are well known in the prior art. Such systems are commonly utilized in manufacturing and fabrication plants and in food processing plants. Generally these systems incorporate an overhead beam or pipe and multiple wheeled conveyor units which run along the beam or pipe. Individual conveyor units are generally coupled utilizing a steel chain or other similar methods. Chain drives or other drive mechanisms are then utilized to move the conveyor units around the system.

Known overhead conveyor systems typically utilize metal conveyor wheels which are supported by ball bearings. Such wheels are subject to rust and the ball bearings utilized must be continually lubricated. A concomitant problem in food processing applications is the continued possibility of lubricant contamination of the food product being processed by the plant.

In addition to the rust and lubrication problems noted above, metal conveyor systems are generally quite noisy and may be subject to corrosion in areas where corrosive chemical vapors are present. In view of the above, several systems have been proposed recently which utilize plastic conveyor wheels and components. While an improvement over known metallic conveyor wheel systems, plastic wheel systems are subject to additional problems.

The incorporation of plastic conveyor wheels brings about additional problems which must be addressed. Typically these plastic wheels require a metallic ferrule or rim which must be pressed into the plastic wheel to support rotation on a metal shaft. This complicates the manufacturing of such wheels and is an area where breakdown or failure may occur. A second problem associated with both plastic and metallic wheels is the difficulty encountered in replacing an individual wheel. Generally, an entire conveyor unit must be disassembled to remove a single wheel. This is necessary due to the inability of a repair technician to secure the inner end of the axle through a wheel in order to remove the fastening device utilized.

Thus, it should be apparent that a need exists for an improved overhead conveyor system which may be easily and simply repaired and maintained.

SUMMARY OF THE INVENTION

It is therefore one object of the present invention to provide an improved overhead conveyor system;

It is another object of the present invention to provide an improved overhead conveyor system which utilizes plastic wheel assemblies; and It is yet another object of the present invention to provide an improved overhead conveyor system which utilizes plastic wheel assemblies which may be simply and easily repaired or replaced.

The foregoing objects are achieved as is now described.

The wheel assembly of the conveyor system of the present invention utilizes a self-lubricating thermoplastic wheel which has a central opening having a conical section. An internally threaded axle member with a conical head is inserted into the central opening of the wheel, generally mating with the conical section of the central opening. An ordinary bolt is then utilized to secure a suspension member to the wheel and axle member combination. In a preferred embodiment of the present invention, the conical head of the axle member includes a slot adapted to receive a screwdriver head. By utilizing a right-angle screwdriver and a wrench, a technician may simply remove an individual conveyor wheel without disassembling a conveyor unit. In those conveyor systems which utilize an I-beam suspension, a pair of wheel assemblies may be utilized in opposite positions to support a single suspension member.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the sole figure, wherein:

DETAILED DESCRIPTION OF THE INVENTION

Figure 1:
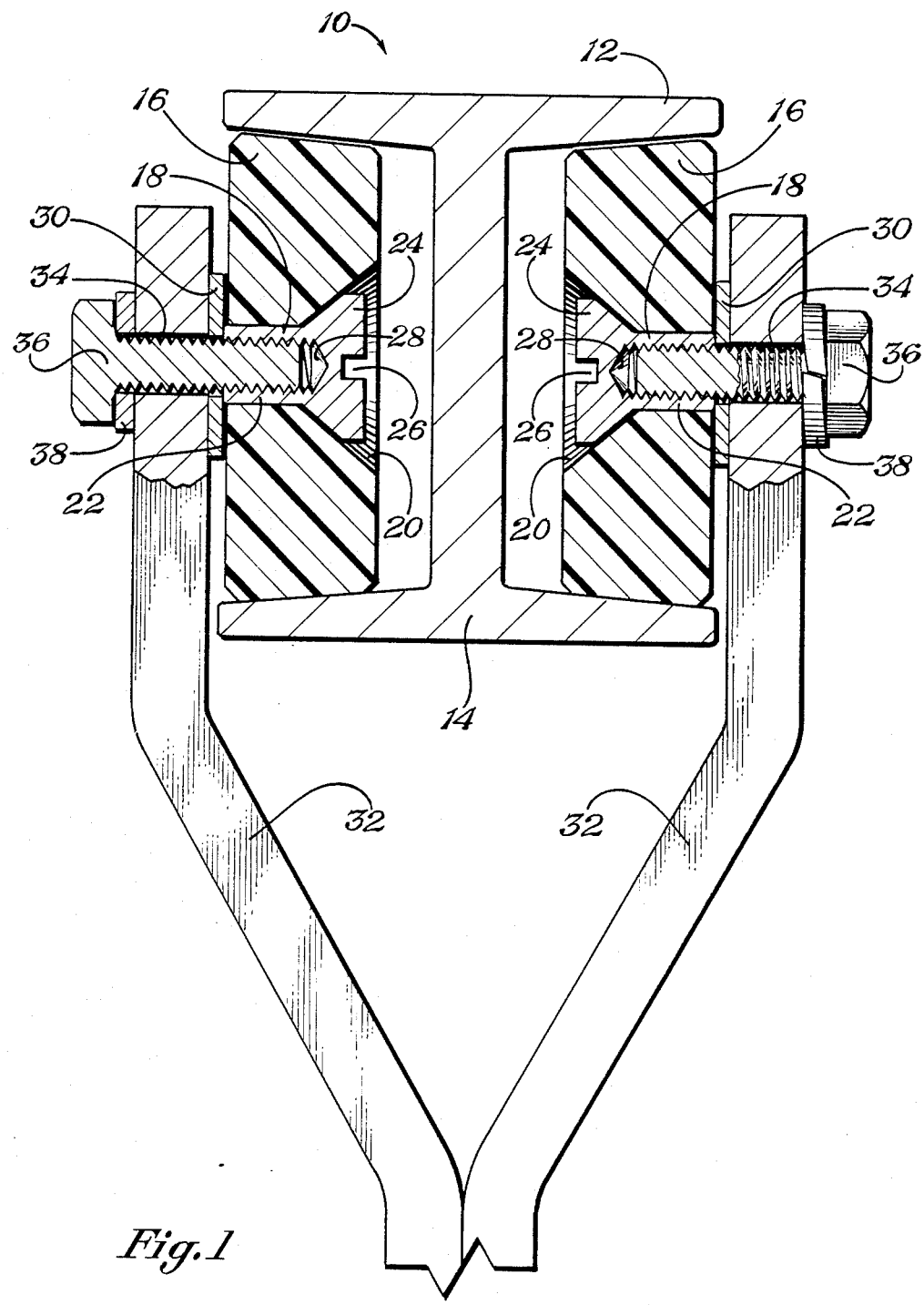
FIG. 1 depicts a sectional view of a conveyor unit in a conveyor system which incorporates the wheel assembly of the present invention.

With reference now to the sole figure, there is depicted a sectional view of a conveyor unit in a conveyor system which incorporates the wheel assembly of the present invention. As can be seen, the conveyor unit of the present invention is suspended from an I-beam 10. I-beam 10 includes an upper flange 12 and a lower flange 24 in a manner and design well known in the fabrication of steel beams. As can be seen, lower flange 14 serves as a track to support wheels 16.

Wheels 16, in a preferred embodiment of the present invention, are preferably provided by utilizing a self-lubricating thermoplastic material. Many examples of a suitable plastic material are available in the art. For example, DuPont Zytel ® ST Nylon Polyamide produced by the E.I. DuPont DeNemours and Company, of Wilmington, Del., is one such suitable material. Additionally, wheel 16 may be manufactured or formed from a plastic manufacturer then sold under the trade name "1900 UHNW", by Hercules Chemical, Inc., of Wilmington, Del. Alternately, an ultra-high molecular weight polymer manufactured and sold under the registered trademark "IMPAX", by Impax Plastics, Inc., of Gastonia, N.C., may also be utilized. The Applicants have discovered that wheel 16 may be manufactured of any suitable type of plastic having an ultra-high molecular weight and high abrasion resistance. Preferably a material having a low coefficient of friction which is self-lubricating will be utilized so that wheel 16 will not require periodic maintenance or lubrication during use. Additionally, a plastic material which is not subject to excessive wear problems is preferred.

As can be seen, each wheel 16 includes a central aperture 18 which includes a conical section 20. In accordance with the present invention, axle member 22 is then inserted into central aperture 18. Each axle member 22 includes a conical head 24 which generally mates with conical section 20 of central aperture 18. As is depicted in FIG. 1, each conical head 24 preferably includes a slot 26 which may be utilized, in a manner which will be explained in detail herein, to assist a technician in the removal and replacement of wheel 16.

As can be seen in FIG. 1, axle member 22 includes an internally threaded aperture 28. Additionally, axle member 22 is preferably manufactured so that when conical head 24 of axle member 22 is mated with conical section 20 of central aperture 18 the internally threaded aperture 28 of axle member 22 will extend slightly beyond the surface of wheel 16.

Wheel 16 and axle member 22 are affixed to suspension member 32 by utilizing an ordinary hex bolt 36. As depicted in the Figure, hex bolt 36 is inserted through a lock washer 38 and flat washer 32 into internally threaded aperture 28 of axle member 22. As those skilled in the art will appreciate, hex head bolt 36 may be threaded into internally threaded aperture 28 through aperture 34 of suspension member 32, such that flat washer 30 will engage with internally threaded aperture 28 of axle member 22. Thus, it should be apparent, that wheel 16 will be permitted to freely rotate about the exterior of axle member 22 without binding.

In the manner depicted, the wheel assembly of the present invention may be simply and easily installed without the necessity of complex ferrule manufacture or rim insertion and without the need for continued lubrication. In the event that a single wheel 16 becomes worn to the point where replacement is desired, it may be replaced simply and easily without the necessity of disassembling the entire conveyor unit. Such disassembly is accomplished by utilizing a common wrench and right-angle screwdriver. The right-angle screwdriver is merely inserted behind wheel 16 to engage slot 26 of conical head 24. The wrench may then be utilized to remove hex head bolt 36 and wheel 36 may be simply and easily removed without the necessity of substantial disassembly of the unit.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A conveyor system wheel assembly comprising:
    a generally cylindrical axle member having an internally threaded aperture at one end and an enlarged head at a second end;
    a wheel adapted to rotate about said axle member, constructed from a self-lubricating thermoplastic material and including a central opening having a diameter slightly larger than the diameter of the said generally cylindrical axle member for receiving said axle member so that said wheel will rotate on said axle member without binding said central opening having at one end an enlarged portion for generally mating with said enlarged head of said axle member; and
    a bolt adapted to be threaded into said internally threaded aperture of said axle member.

2. The conveyor system wheel assembly according to claim 1 wherein said wheel is constructed of an ultra-high molecular weight polymer having high abrasion resistance and a low coefficient friction.

3. The conveyor system wheel assembly according to claim 1 wherein the length of said axle member is such that said internally threaded aperture extends beyond said central opening of said wheel when said enlarged head of said axle member is mated with said enlarged portion of said central opening of said wheel.

4. The conveyor system wheel assembly according to claim 3 further including a washer for engaging said internally threaded aperture extending beyond said central opening of said wheel wherein said wheel will rotate on said axle member without binding.

5. The conveyor system wheel assembly according to claim 4 wherein said enlarged head of said axle member includes structure adapted to be mated with a selected hand tool wherein rotation of said axle member may be selectively restrained.

6. The conveyor system wheel assembly according to claim 5 wherein said enlarged head of said axle member includes a slot adapted to receive a screwdriver.

7. A conveyor system comprising:
    a track member having at least one generally horizontally disposed surface;
    a wheel adapted to roll on said generally horizontally disposed surface, constructed from a self-lubricating thermoplastic material and including a central opening having a diameter slightly larger than the diameter of a generally cylindrical axle member, said central opening including at one end an enlarged portion;
    said generally cylindrical axle member adapted to be inserted within said central opening so that said wheel will rotate on said axle member without binding, said axle member having an internally threaded aperture at one end and an enlarged head at a second end adapted to generally mate with said enlarged portion of said central opening;
    a suspension member having an aperture therethrough; and
    a bolt adapted to be inserted through said aperture in said suspension member and threaded into said internally threaded aperture of said axle member.

8. The conveyor system according to claim 7 wherein said wheel is constructed of an ultra-high molecular weight polymer having high abrasion resistance and a low coefficient friction.

9. The conveyor system according to claim 7 wherein the length of said axle member is such that said internally threaded aperture extends beyond said central opening of said wheel when said enlarged head of said axle member is mated with said enlarged portion of said central opening of said wheel.

10. The conveyor system according to claim 9 further including a washer disposed between said suspension member and said internally threaded aperture of said axle member, said washer adapted to engage with said internally threaded aperture extending beyond said central opening of said wheel wherein said wheel will rotate on said axle member without binding.

11. The conveyor system according to claim 7 wherein said enlarged head of said axle member includes structure adapted to be mated with a selected hand tool wherein rotation of said axle member may be selectively restrained.

12. The conveyor system according to claim 11 wherein said enlarged head of said axle member includes a slot adapted to receive a screwdriver.

* * * * *